(12) United States Patent
Ignatowski et al.

(10) Patent No.: US 10,405,378 B2
(45) Date of Patent: Sep. 3, 2019

(54) HIGH FREQUENCY POWER SUPPLY SYSTEM WITH CLOSELY REGULATED OUTPUT FOR HEATING A WORKPIECE

(71) Applicant: Thermatool Corp., East Haven, CT (US)

(72) Inventors: Thomas G. Ignatowski, Orange, CT (US); Michael A. Nallen, Hampden, MA (US); Lesley D. Frame, New Haven, CT (US)

(73) Assignee: THERMATOOL CORP., East Haven, CT (US)

( * ) Notice: Subject to any disclaimer, the term of this patent is extended or adjusted under 35 U.S.C. 154(b) by 398 days.

(21) Appl. No.: 15/388,277

(22) Filed: Dec. 22, 2016

(65) Prior Publication Data

US 2017/0181227 A1   Jun. 22, 2017

Related U.S. Application Data

(60) Provisional application No. 62/270,952, filed on Dec. 22, 2015.

(51) Int. Cl.
*H05B 6/06* (2006.01)
*H05B 6/08* (2006.01)
*H05B 6/02* (2006.01)
*B23K 13/08* (2006.01)

(52) U.S. Cl.
CPC ............. *H05B 6/08* (2013.01); *B23K 13/08* (2013.01)

(58) Field of Classification Search
CPC .................................. H05B 6/08; B23K 13/08

USPC ....... 219/665, 608, 603, 612, 617, 615, 661, 219/663, 666, 61.2, 61.5, 108, 1, 10, 115; 331/62, 64, 167
See application file for complete search history.

(56) References Cited

U.S. PATENT DOCUMENTS

| | | | | |
|---|---|---|---|---|
| 5,902,506 A | * | 5/1999 | Scott | ........................ H05B 6/08 219/110 |
| 2007/0095878 A1 | | 5/2007 | Scott et al. | |
| 2013/0008877 A1 | | 1/2013 | Han et al. | |
| 2013/0039815 A1 | | 2/2013 | Murata | |
| 2015/0162119 A1 | | 6/2015 | Nakatsu et al. | |

FOREIGN PATENT DOCUMENTS

EP   1683600 A2   7/2006

* cited by examiner

*Primary Examiner* — Quang T Van
(74) *Attorney, Agent, or Firm* — Philip O. Post

(57) ABSTRACT

High frequency electrical heating system is provided for heating electrically conductive parts as they are advanced, either for annealing or welding processes, and in which the electrical heating current is supplied by a solid state DC to AC inverter through a load matching and frequency control circuit that maintains the desired load current and frequency with changes in the load impedance caused by the electrically conductive parts as they are advanced. Load matching is achieved with high frequency variable reactors having a geometrically-shaped moveable insert core section and a stationary split-bus section with a complementary geometrically-shaped split bus section and a split electric terminal bus section where the insert core section can be moved relative to the stationary split-bus section to vary the inductance of the reactor pair.

20 Claims, 9 Drawing Sheets

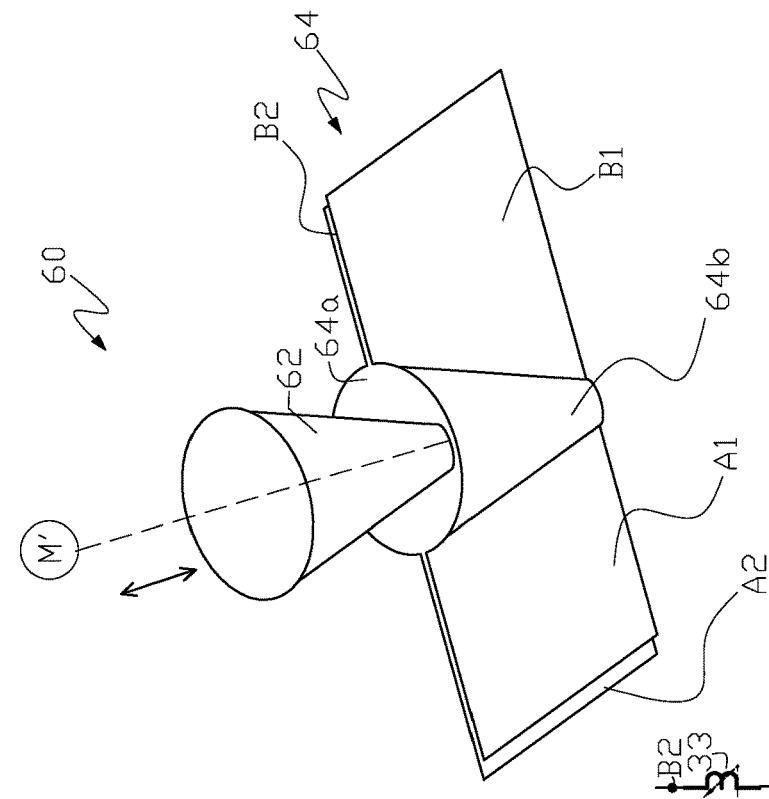
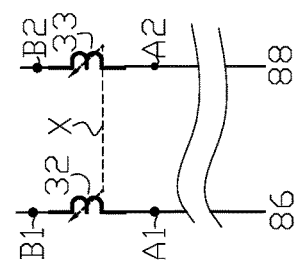
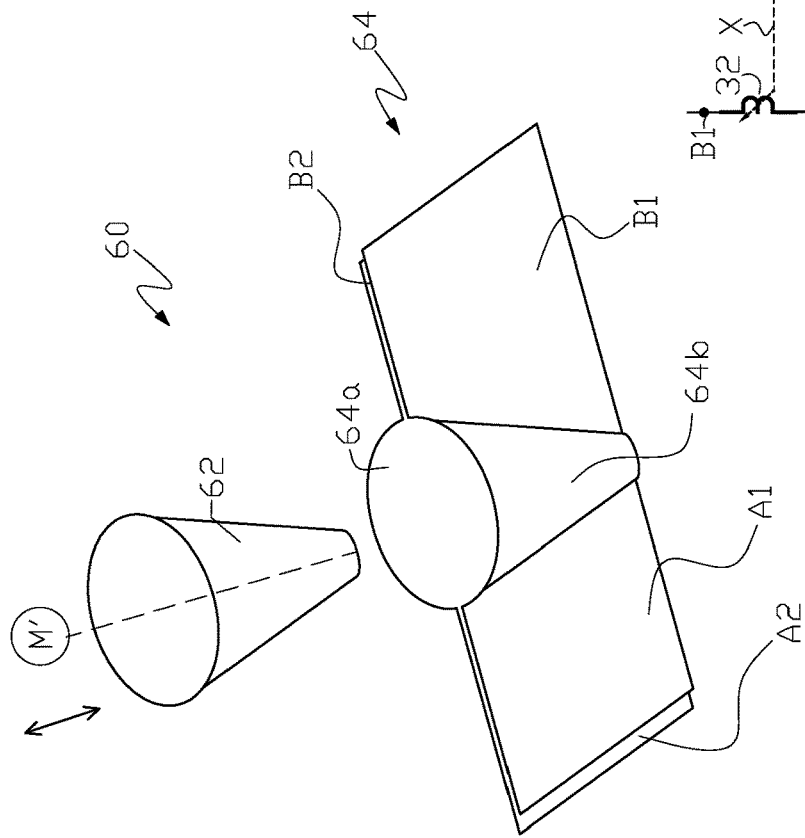
FIG. 4(a)
FIG. 4(b)
FIG. 4(c)

HIGH FREQUENCY POWER SUPPLY SYSTEM WITH CLOSELY REGULATED OUTPUT FOR HEATING A WORKPIECE

CROSS REFERENCE TO RELATED APPLICATIONS

This application claims priority to U.S. Provisional Application No. 62/270,952 filed Dec. 22, 2015, hereby incorporated herein by reference in its entirety.

FIELD OF THE INVENTION

The present invention relates to high frequency power supply systems with closely regulated outputs for the heating of a portion or portions of a metal part or parts as the portion or the portions of the metal part or parts are advanced.

BACKGROUND OF THE INVENTION

Induction welding is a form of welding that uses electromagnetic induction to heat a portion or portions of a metal part or parts as the portion or the portions of the metal part or parts are advanced. The heated portion or portions, for example, the opposing edges of a metal sheet, are welded together by applying a force between the inductively heated portion or portions, for example, to form a tubular product, in an ambient atmosphere or a controlled environment such as an inert gas or vacuum.

Electric resistance welding (ERW) is a form of welding that uses resistance heating to heat a portion or portions of a metal part or parts as the portion or the portions of the metal part or parts are advanced. The heated surfaces are welded together by applying a force between the resistively heated portion or portions, for example, the opposing edges of a metal sheet, in an ambient atmosphere or a controlled environment such as an inert gas or vacuum to form a tubular product.

High frequency solid state power supplies used in induction or resistance welding processes can also be used in other heating processes, for example, induction annealing (heat treatment) processes where a metal workpiece or workpiece zone, such as a previously formed weld seam, requires heat treatment. The induction coil and the magnetically coupled workpiece heat treatment zone form an electric load circuit with dynamically changing load characteristics during the annealing process.

U.S. Pat. No. 5,902,506 (the '506 patent), which is incorporated herein by reference in its entirety, discloses a high frequency forge welding or annealing power supply system using variable reactors in a load matching apparatus.

It is one objective of the present invention to provide a high frequency forge welding or annealing power supply system with improved variable reactors over that disclosed in U.S. Pat. No. 5,902,506 that provide a high frequency power supply system with a closely regulated output.

BRIEF SUMMARY OF THE INVENTION

In one aspect the present invention is a high frequency electrical heating system for the heating a portion or portions of a metal part or parts as the portion or the portions of the metal part or parts are advanced where the high frequency electrical heating system comprises a solid state inverter and a load matching and frequency control apparatus in which pairs of variable reactors are used to achieve a closely regulated output from the high frequency electrical heating system to a load.

In another aspect the present invention is a high frequency variable reactor having a geometrically-shaped moveable insert core section and a stationary split-bus section with a complementary geometrically-shaped split bus section and a split-bus electric terminals for connecting the variable reactor to a circuit where the insert core section can be moved into or out of the complementary geometrically-shaped split bus section to vary the inductance of the reactor pair.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims.

FIG. 4(a) and FIG. 4(b) illustrate one example of a geometrically-shaped pair of variable reactors of conic shape with a single solid or hollow conductive core insert of the present invention that can be used in a load matching apparatus of the high frequency power supply system of the present invention.

FIG. 4(c) is a detail of the load matching and frequency control apparatus shown in FIG. 1 or FIG. 2 showing where the pair of variable reactors in FIG. 4(a) and FIG. 4(b) are used for reactor pair 32-33 in FIG. 1 of FIG. 2.

DETAILED DESCRIPTION OF THE INVENTION

Figure 1:
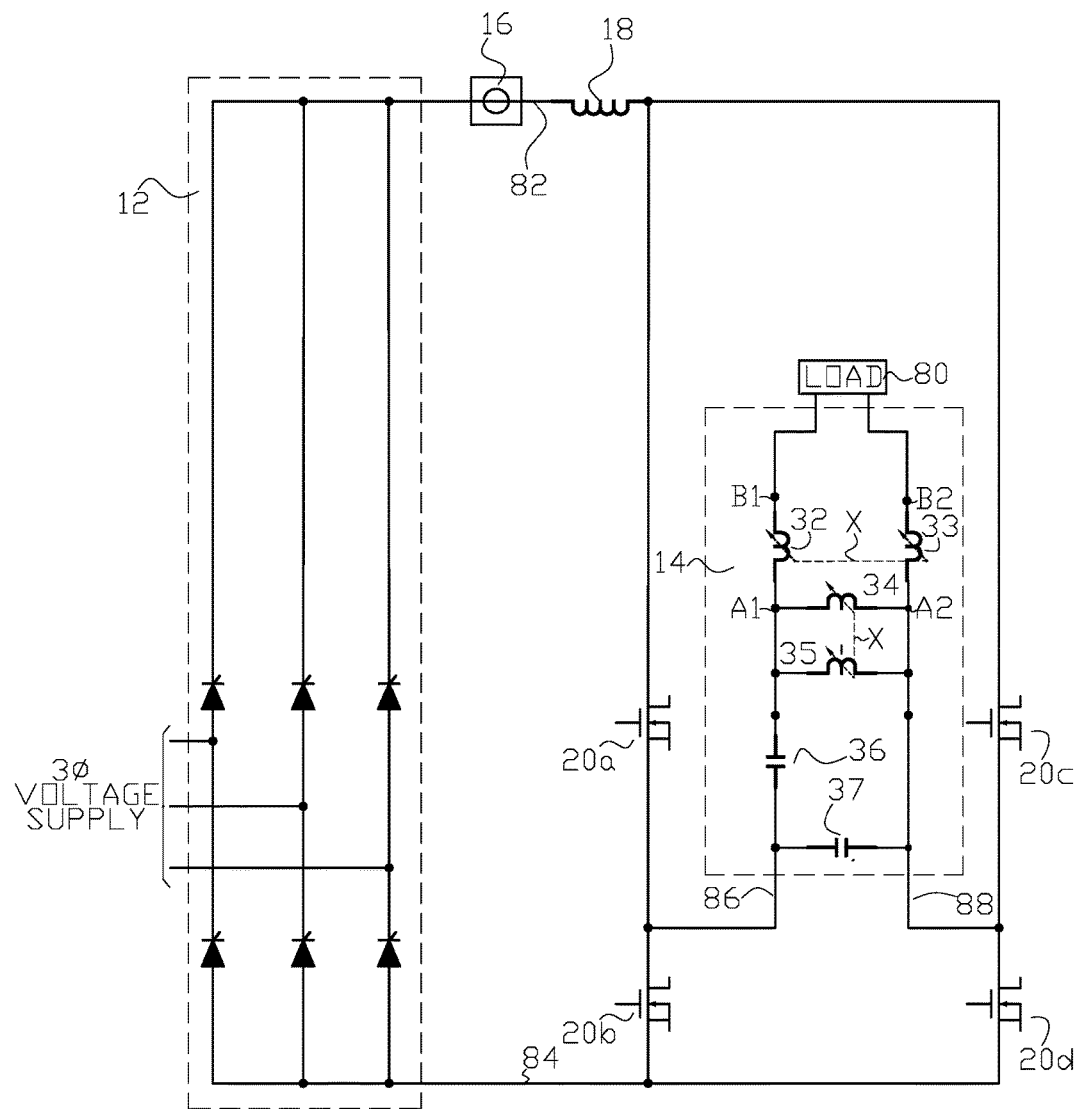
FIG. 1 is one example of a simplified diagram of a high frequency heating power supply system of the present invention utilizing a current source inverter.

In FIG. 1 rectifier 12 converts three phase alternating current to direct current and is connected to an inverter circuit comprising transistors 20a, 20b, 20c and 20d through leads 82 and 84 and fixed inductor 18. The transistors may be metal-oxide-semiconductor field-effect transistors or other suitable solid state switching devices. Current sensor 16 provides an output proportional to the current supplied to the inverter and hence, to load 80. When a high frequency power supply heating system of the present invention is used, for example, in an induction welding or annealing application or electric resistance welding application, load 80 includes electrical leads and an induction coil or electric contacts (contacting the portion or portions) to be welded, annealed or otherwise heated.

Inverter output leads 86 and 88 are connected to load 80 by load matching apparatus 14 which comprises: a first pair of variable reactors 32 and 33, with each one of the pair of variable reactors connected electrically in series between each one of the inverter output leads and load 80; a second pair of variable reactors 34 and 35 with each one of the pair of variable reactors connected electrically in parallel with the inverter output leads; a first (optional) high frequency low loss capacitor 36 connected electrically in series between an inverter output lead and load 80; and a second high frequency low loss capacitor 37 electrically connected in parallel with the inverter output leads with all components arranged in one embodiment of the invention as shown in FIG. 1.

Load 80, the reactor pairs 32-33 and 34-35 and capacitors 36 (if used) and 37 form a tank circuit connected to the inverter output leads. Maximum power transfer is achieved when inductive reactance and capacitance reactance are equal. Selection of the values for the capacitors 36 (if used) and 37 and the ranges for the two variable reactor pairs 32-33 and 34-35 proceeds from determining the nominal load inductance range, which is the sum of the nominal load inductance and, if used, any magnetic core (impeder) within the tubular article being formed if the heating process is induction welding, and the ancillary bus work inductance, the range of load resistances to be matched to the welder in a welding application, and the welding frequency for a welding application. Also required is knowledge of the value of resistive impedance into which the inverter can deliver its full power. With this knowledge, the value $C_p$ of capacitor 37 is calculated to be that value necessary to support the highest circulating current produced by the tank circuit at full power output. This can be shown to be:

$$C_p = \left(\frac{1}{2 \cdot \pi \cdot f}\right) \cdot \left(\frac{1}{\sqrt{R_o \cdot R_{min}}}\right)$$

where:

π equals 3.1415926;

f is equal to the desired application frequency;

$R_o$ is equal to the resistive impedance required by the inverter to deliver its full power output, and $R_{min}$ is the minimum resistive impedance expected at the work coil terminals in an induction welding or annealing process.

Knowing $C_p$, the value $C_s$ of capacitor 36 (if used) is calculated to cause the tank circuit to resonate at the welding frequency in a welding application:

$$C_s = (C_p \cdot L_{nom} \cdot (2 \cdot \pi \cdot f)^2 - 1) \text{ where:}$$

$L_{nom}$ equals the nominal load inductance.

With the values chosen above, the circuit shown in FIG. 1 will provide the correct resistive impedance to the inverter so it can provide its full power output when the work coil exhibits its nominal inductance and minimum resistance, and when the inductance of the two variable reactor pairs 32-33 and 34-35, can be neglected, that is, the $L_p$ of reactor pair 34-35 is essentially infinite and the $L_s$ of the reactor pair 32-33 has essentially zero inductance.

To match higher values of work coil resistance in an induction welding or annealing application, variable reactor pair 32-33 must be adjusted to achieve the current necessary to dissipate the same power as was achieved in the minimum load resistance case. This can be accomplished by increasing the reactance value of reactor pair 32-33, recognizing that the voltage across reactor pair 34-35 is constant at full power output if the load is matched. Because the load reactance is much higher than the resistance (high Q load), a good approximation is that:

$$L_{s(max)} = \left(\sqrt{\frac{R_{max}}{R_{min}}} - 1\right) \cdot L_{nom}$$

where:

$L_{s(max)}$ is the required maximum design value for variable reactor pair 32-33, and $R_{max}$ is the maximum load resistance expected at the terminals of the load current supplying device.

However as $L_s$ is increased to match larger load resistances: the inductance of the tank circuit increases; its resonant frequency drops; and thus, the application frequency is reduced. To maintain the application frequency at its desired value, the reactance $L_p$ of variable reactor pair 34-35 is reduced so that the effective inductance of the circuit is always equal to $L_{nom}$:

$$L_{p(min)} = L_{nom} \cdot (L_{nom} \cdot L_{s(max)}) \cdot L_{s(max)}$$

Thus two variable reactor pairs are needed, one adjustable in reactance from $L_{p(min)}$ to a large value, and one adjustable from a small value of inductance to $L_{s(max)}$. These reactor pairs are designed in a way that the values of their reactance can be adjusted when the inverter is delivering full power.

Figure 2:
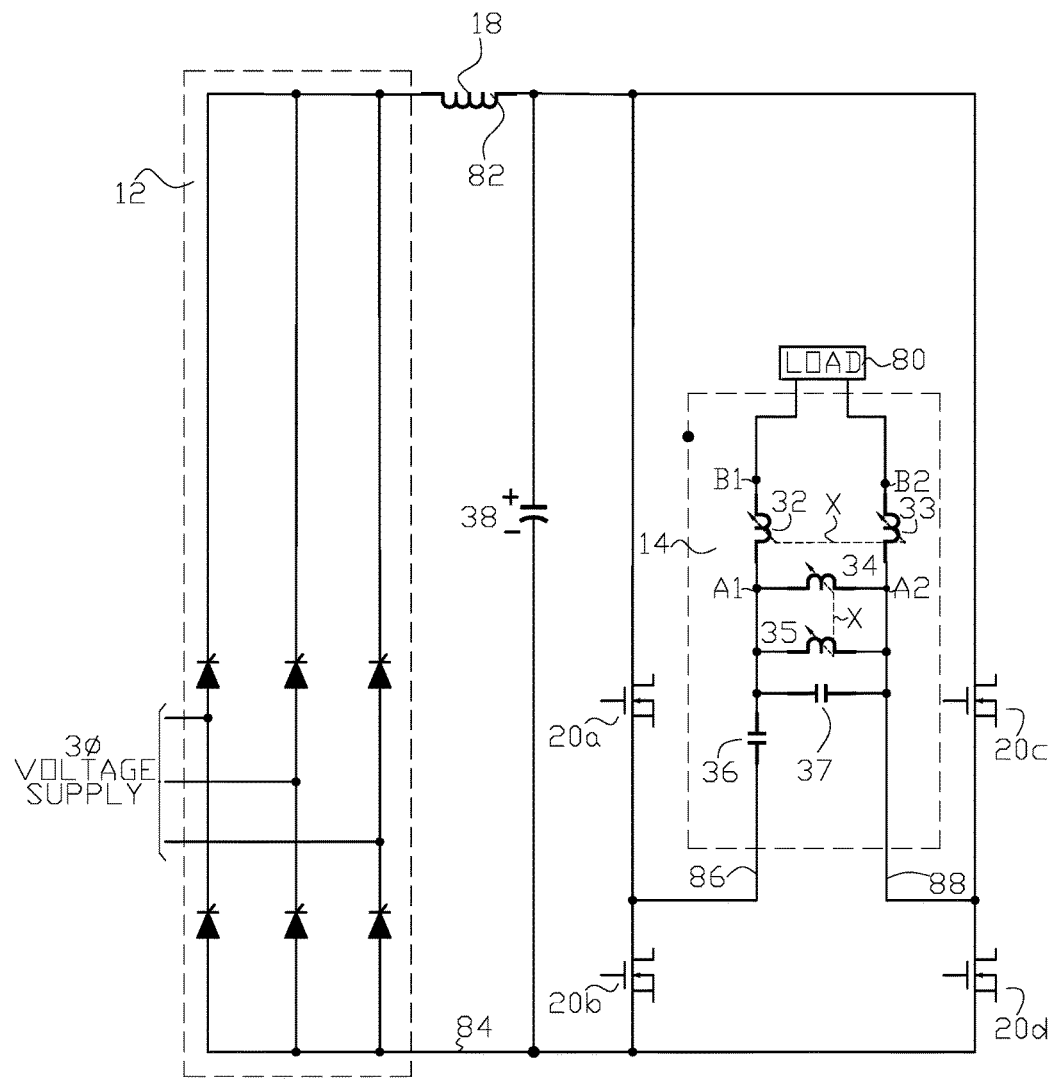
FIG. 2 is one example of a simplified diagram of a high frequency heating power supply system of the present invention utilizing a voltage source inverter.

FIG. 2 illustrates schematically a voltage source tuned inverter connected to a load by load matching apparatus 14. Corresponding elements in FIG. 2 are designated by the reference numerals used in FIG. 1. A filtering capacitor 38 is also used and the position of capacitor 36 relative to the other elements has been changed in FIG. 2. Capacitor 37 in FIG. 2 is optional for the voltage source inverter embodiment.

The selection of the values for reactors and capacitors 32 through 37 in FIG. 2 is accomplished essentially as described in connection with FIG. 1. Also the variable reactor pairs 32-33 and 34-35 are adjusted as described in connection with FIG. 1, the objective being to make the load matching apparatus 14 connected to load 80 resonant at the desired operating frequency.

The leads connecting the load current supplying means, for example electric contacts in an electric resistance welding process of a tubular article or induction coils in an induction welding or annealing process of a tubular article, have inductive reactance and resistance; the electric contacts have inductive reactance and resistance and the induction coils have inductive reactance and resistance. In an electric resistance welding process, a tubular article being formed presents inductive reactance and resistance at the electric contacts, and in an induction welding or annealing process the reactance of the induction coil is affected by the material of a tubular article being formed or heated, which can vary along its length, and by the spacing between the induction coil and the tubular article. Thus, as the tubular article is advanced, the impedance presented to the output of the load matching apparatus normally varies, and it is necessary to compensate for the variations to maintain a heating current of substantially constant magnitude and frequency.

Figure 3:
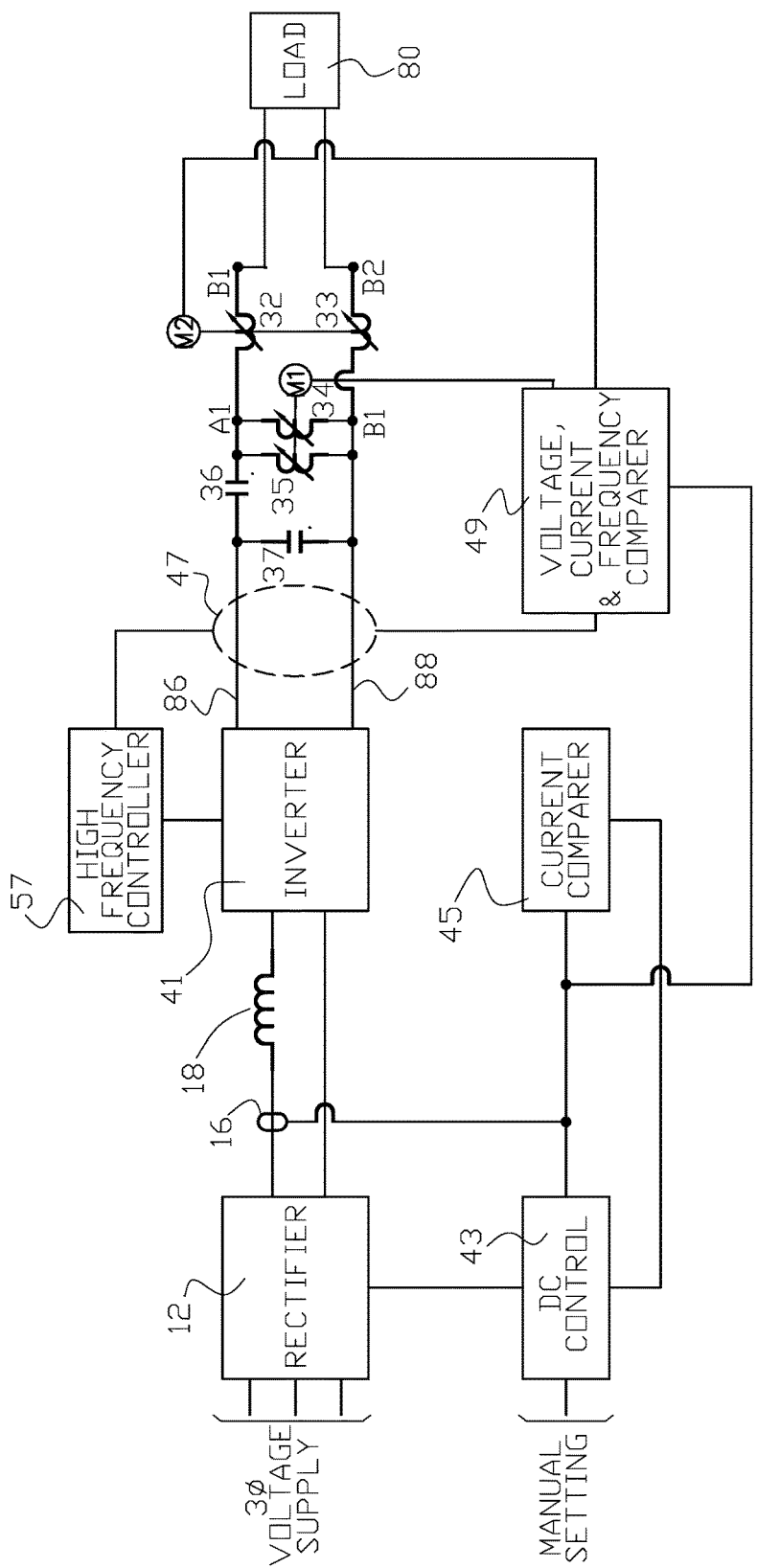
FIG. 3 is one example of a simplified diagram of a control system for a high frequency heating power supply system of the present invention.

FIG. 3 is a schematic diagram of an automatic control apparatus which can be used with the apparatus shown in FIG. 1 to control the impedance presented to inverter 41 at its output leads 86 and 88 and hence, the frequency and magnitude of the current supplied by the inverter 41.

Although not shown in FIG. 1 or FIG. 2, rectifier 12 can have a DC control 43 for controlling the DC voltage output of rectifier 12 as shown in FIG. 3. The nominal level of the rectifier output can, as indicated in FIG. 3, be set manually. Output current from current sensor 16 is supplied to a current comparer 45, and the output of comparer 45 is supplied to DC control 43 to insure that the maximum current level is not exceeded.

The output of current sensor 16 and the output of voltage and frequency sensor 47 (shown diagrammatically and selected to provide information as to the voltage and frequency of the power at the leads 86 and 88) are supplied to comparer 49 which compares the measured voltage, current and frequency with predetermined values of voltage, current and frequency and acts as a load matching control for maintaining the desired load impedance and inverter frequency at the output of the inverter 41. Comparer 49 provides an electrical output which powers an actuator, for example, motor M2 for varying the reactance control element for series reactor pair 32-33 and an electrical output which powers an actuator, for example, motor M1, for varying the reactance control for parallel reactor pair 34-35.

The output of voltage and frequency sensor 47 is also supplied to high frequency controller 57 which controls and synchronizes the firing of inverter transistors 20*a* through 20*d*.

In one preferred embodiment of the present invention, at a regular controlled interval comparer 49 performs the following functions:

(1) measures the voltage and current and if the resulting ratio of the measured voltage to the maximum voltage, to the ratio of the measured current to the maximum current is greater than a preset value, such as 1.05, the output of comparer 49 causes motor M2 to operate so as to decrease the reactance of reactor pair 32-33; if the resulting ratio is less than a pre-set value, such as 0.95, comparer 49 output causes motor M2 to operate so as to increase the reactance of reactor pair 32-33; and (2) compares the measured frequency with the desired frequency, and if the ratio of the measured frequency to the desired frequency is greater than a preset value, such as 1.05, the output of comparer 49 causes motor M1 to operate so as to increase the reactance of reactor pair 34-35; if the ratio is less than a preset value, such as 0.95, the output of comparer 49 causes the motor M1 to operate so as to reduce the reactance of reactor pair 34-35.

The levels at which adjustments of reactor pairs 32-33 and 34-35 are made can be different depending on the permissible variations of load matching desired.

The load matching control or comparer 49 in conjunction with variable reactor pairs 32-33 and 34-35 control the impedance presented to inverter 41 at the leads 86 and 88. Thus, reactor pair 34-35 controls the frequency at which inverter 41 operates, and reactor pair 32-33 controls the reactance in series with the load 80 so that in conjunction with reactor pair 34-35, the impedance presented to inverter 41 at the output leads 86 and 88 is equal, or substantially equal to, the impedance of the inverter 41 thereby causing the supply of electrical power at the leads 86 and 88 to be a maximum. By using relatively low loss capacitors 36 (if used) and 37, relatively low loss reactor pairs 32-33 and 34-35 and relatively low loss leads between the leads 86 and 88 and load 80, maximum power will also be supplied to the load 80.

Figure 6:
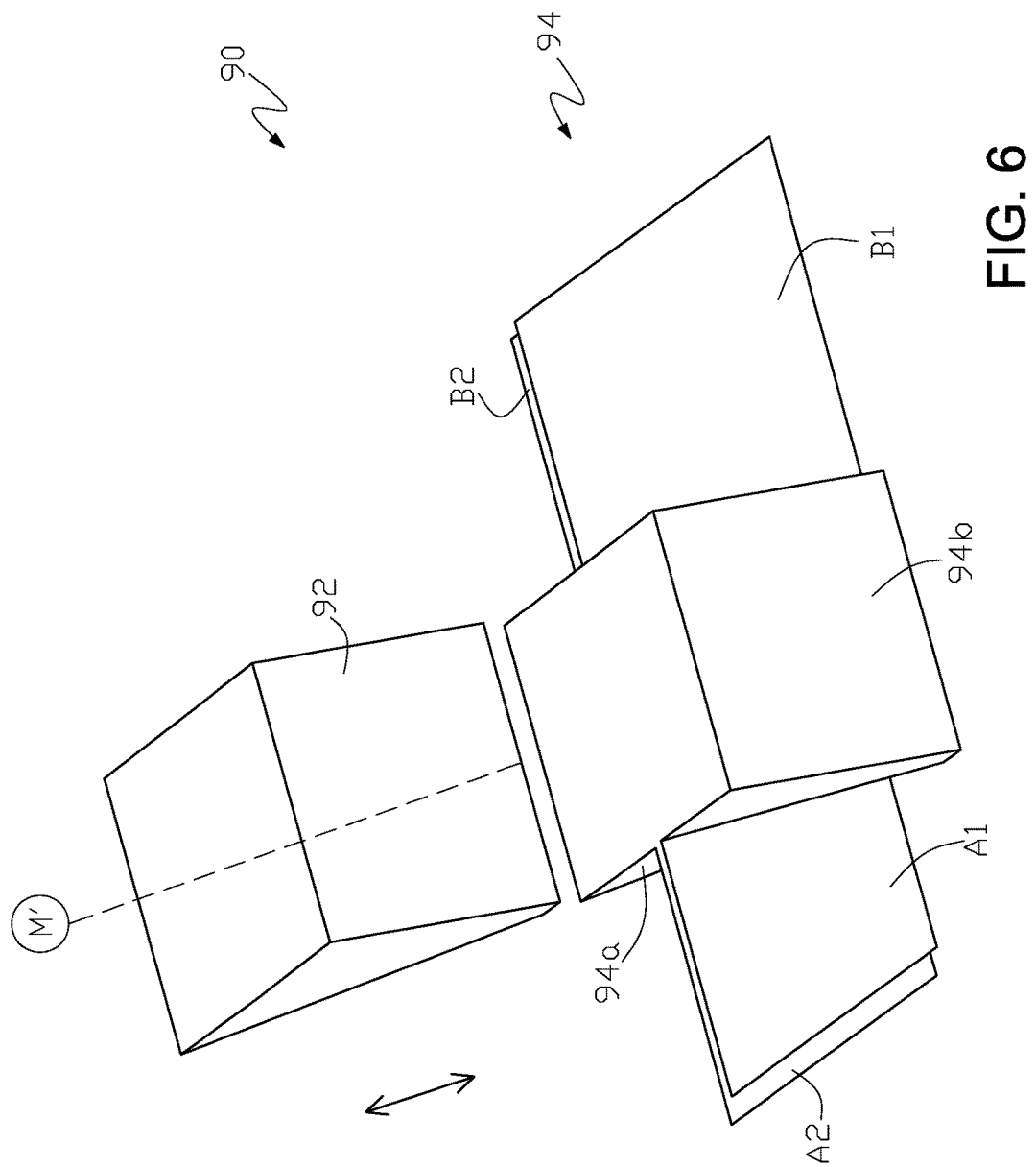
FIG. 6 illustrates one example of a high frequency variable reactor of the present invention in the shape of a wedge that can be used in a load matching apparatus of the high frequency power supply system of the present invention.
Figure 7:
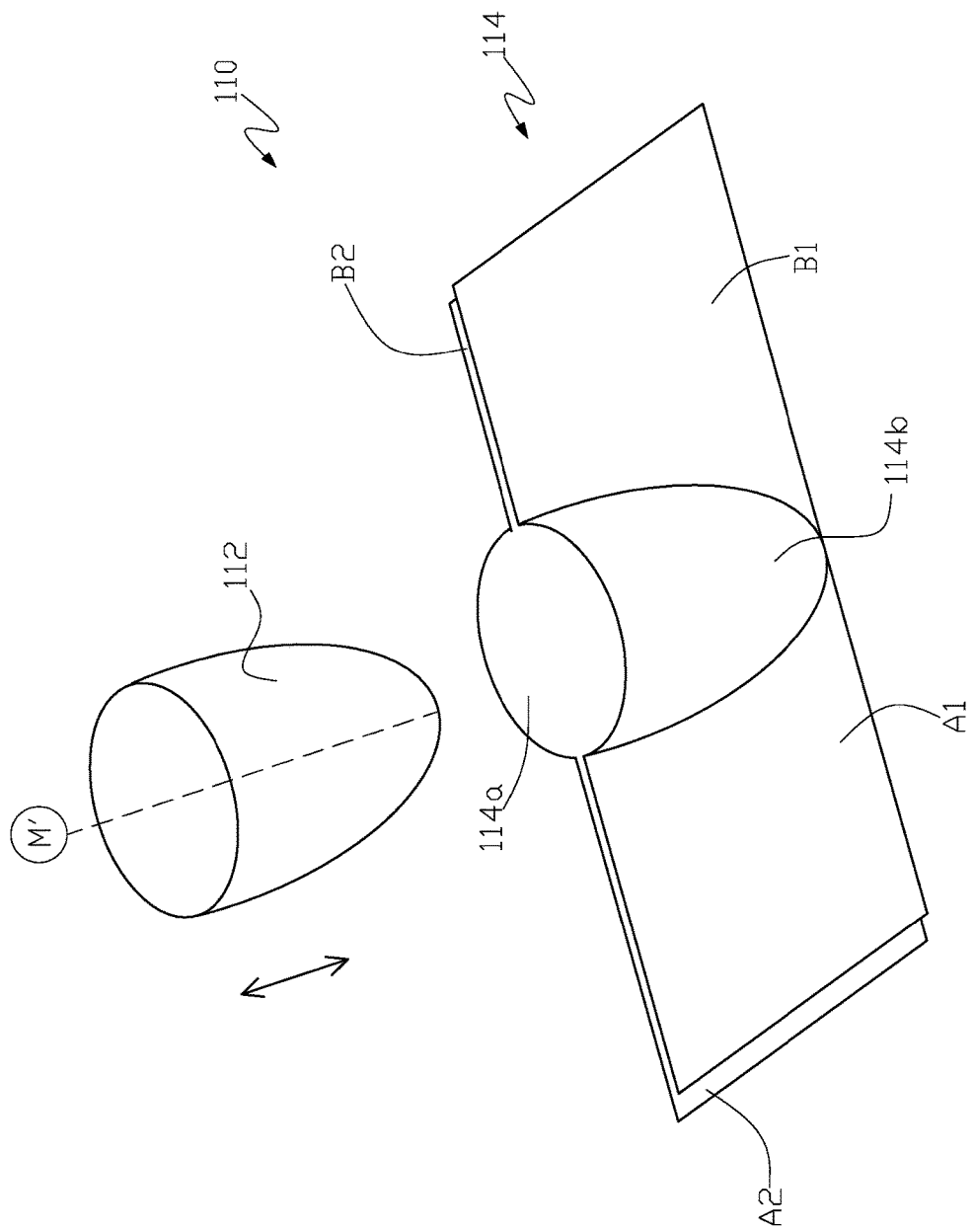
FIG. 7 illustrates one example of a high frequency variable reactor of the present invention in the shape of an elliptic paraboloid that can be used in a load matching apparatus of the high frequency power supply system of the present invention.
Figure 8A:
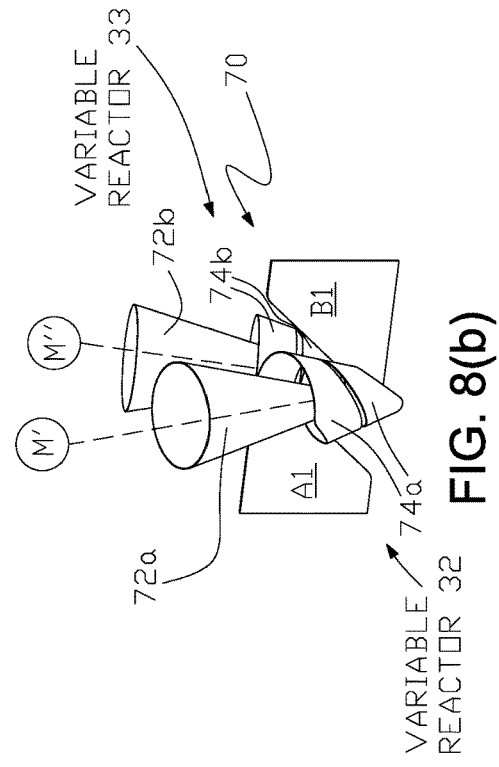
FIG. 8(a) through FIG. 8(d) illustrate one example of a high frequency variable reactor of the present invention comprising a pair of two-turn variable reactors of conic shape that can be used in a load matching apparatus of the high frequency power supply system of the present invention.
Figure 8B:
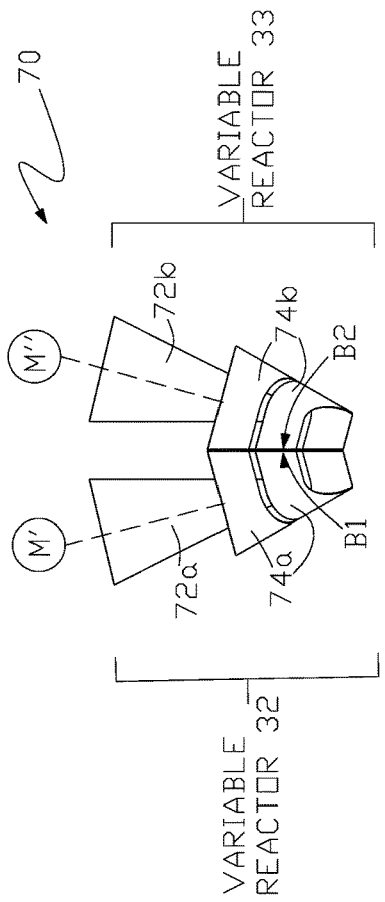
Figure 8C:
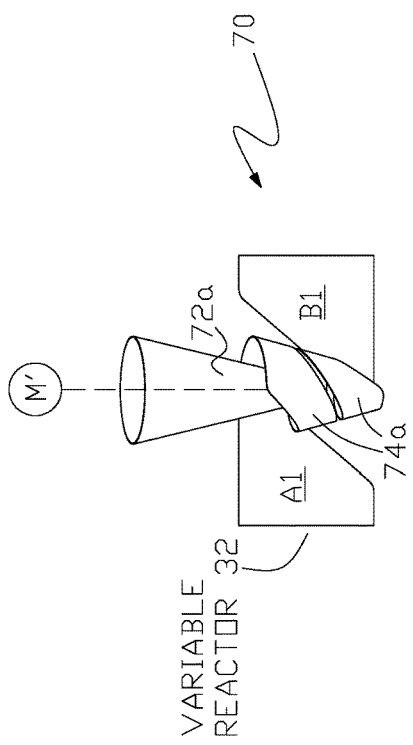
Figure 8D:
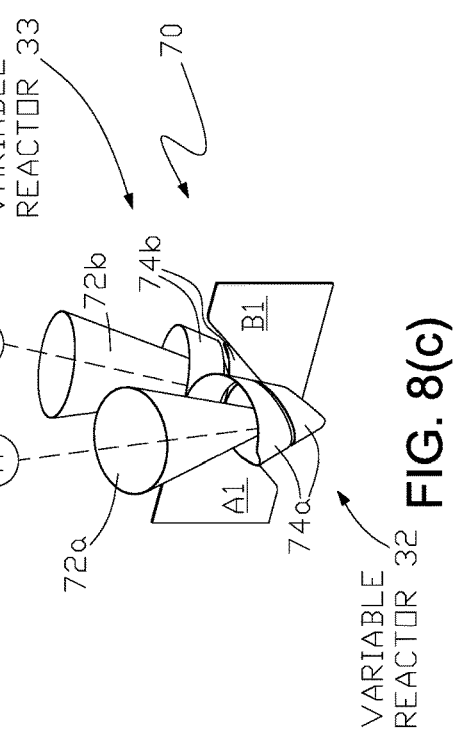

In the present invention, either or both reactor pairs 32-33 and 34-35 can be formed from a geometrically-shaped pair of reactors having a single moveable geometrically-shaped insert core and a stationary split-bus that are constructed in one embodiment of the invention from electrically conductive sheet materials, such as copper, as shown, for example, as complementary conic sections, wedge (a polyhedron defined by two triangles and three trapezoid faces) sections or parabolic conic sections in FIG. 4(*a*) and FIG. 4(*b*), FIG. 6 or FIG. 7 respectively.

For example in one embodiment of the invention, there is shown in FIG. 4(*a*) and FIG. 4(*b*) variable reactor pair 60 where a single short-circuited geometrically-shaped insert core section 62, which serves as the reactance control element, is moved into or out of the stationary and complementary geometrically-shaped split conic bus sections 64*a* and 64*b* of stationary spilt-bus section 64 as shown by the double headed arrows in FIG. 4(*a*) and FIG. 4(*b*), the magnitude of induced current in the insert core section 62 establishes a variable magnetic flux field (also referred to as the variable energy field) from alternating current flow in the complementary geometrically-shaped split conic bus sections 64*a* and 64*b* of stationary split bus section 64 to establish a variable inductance at the split electric bus terminal sections A1-B1 and A2-B2 of the alternating current buses for each of the pair of reactors that can have a range of variable inductance from a minimum inductance valve when the geometrically-shaped insert core section 62 is fully inserted into the complementary geometrically-shaped split conic bus sections 64*a* and 64*b* to a maximum inductance value when the geometrically-shaped insert core section 62 is withdrawn to a position, for example as shown in FIG. 4(*a*), where the variable energy field in the shaped interleaving space between the insert core section 62 and stationary spilt-bus section 64 is at a maximum value. FIG. 4(*c*) illustrates variable reactor pair 60 connected in the high frequency power supply system of FIG. 1 or FIG. 2 as variable reactor pair 32-33. Stationary split bus section 64 comprises electrically isolated split conic bus sections 64*a* and 64*b* and split electric terminal sections A2 and B2 (associated with conic bus section 64*a*) and split electrical terminal sections A1 and B1 (associated with conic bus section 64*b*). That is, electrically interconnected bus section 64a and split electric bus terminal sections A2 and B2 are spatially separated from electrically connected bus section 64b and terminal sections A1 and B1.

The geometric form of the magnetically interacting moveable insert core section and the stationary bus elements are selected for a particular application based on the degree of precision in the variation of inductance that can be achieved with the geometrically-shaped reactor pair, which degree of precision relates to the degree of precision regulation in the output frequency of the high frequency power supply of the present invention better than that obtained, for example, with a power supply of the U.S. Pat. No. 5,902,506.

Each geometrically-shaped reactor pair comprises a pair of reactors, for example, reactors 32-33 and 34-35 in FIG. 1 or FIG. 2 that are adjustable in pairs as indicated by dashed line interconnection X in FIG. 1 or FIG. 2. For example for reactor pair 32-33, by movement of the insert core section 62 into or out of the geometrically-shaped split bus section of stationary bus section 64 as shown in FIG. 4(a) and FIG. 4(b) with an actuator, for example, motor M2 as shown in control FIG. 3 (or actuator M' in FIG 4(a) and FIG. 4(b)).

The designations of the AC buses (A1-B1) and (A2-B2) for reactor pair 32-33 in FIG. 1 and FIG. 2 are the same as that for the conic shaped reactors in FIG. 4(a) and FIG. 4(b).

Figure 5B:
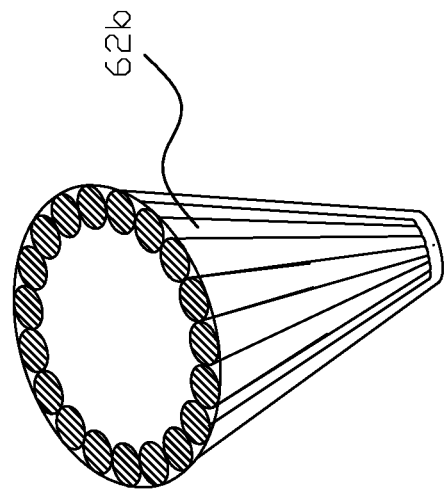
FIG. 5(b) illustrates one example of a single geometrically-shaped insert core formed from an array of ferrite rods that can be used in the pair of reactors shown in FIG. 4(a) and FIG. 4(b).
Figure 5A:
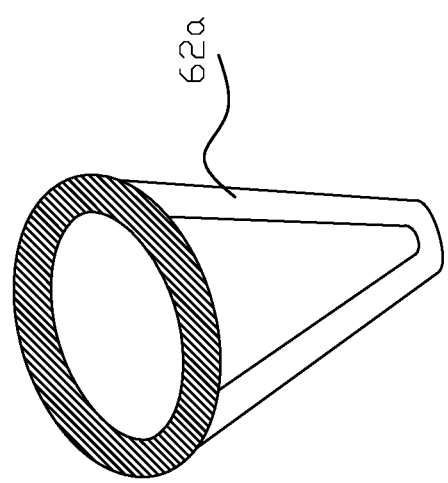
FIG. 5(a) illustrates one example of a single geometrically-shaped insert core formed from a solid or hollow ferrite that can be used in the pair of variable reactors shown in FIG. 4(a) and FIG. 4(b).

FIG. 5(a) and FIG. 5(b) illustrate use of magnetic materials (for example ferrite 62a) for the conic core insert section 62 with the conic shaped reactor pair 60 in FIG. 4(a) and FIG. 4(b). In FIG. 5(a) the conic core insert section 62a comprises a solid or hollow magnetic material core. In FIG. 5(b) the conic core insert section 62b comprises an array of ferritic rods forming the outer perimeter of the core insert section.

FIG. 6 illustrates another example of a high frequency variable reactor 90 of the present invention that can be used with a high frequency power supply system of the present invention. The high frequency variable reactor 90 comprises a single short-circuited insert core section 92 in the geometric shape of a polyhedron defined by two triangles and three trapezoid faces, which is identified here by its common name as a wedge section, that is moved inward or outward into the stationary and complementary geometrically-shaped split wedge bus sections 94a and 94b of stationary spilt-bus section 94 as shown by the double headed arrows in FIG. 7, the magnitude of induced current in the insert core section 92 establishes a variable magnetic flux field (also referred to as the variable energy field) from alternating current flow in the complementary geometrically-shaped split wedge bus sections 94a and 94b of stationary split bus section 94 to establish a variable inductance at the split electric bus terminal sections A1-B1 and A2-B2 of the alternating current buses for each of the pair of reactors that can have a range of variable inductance from a minimum inductance valve when the geometrically-shaped insert core section 92 is fully inserted into the complementary geometrically-shaped split conic bus sections 94a and 94b to a maximum inductance value when the geometrically-shaped insert core section 92 is withdrawn to a position where the variable energy field in the shaped interleaving space between the insert core section 92 and stationary spilt-bus section 94 is of maximum value. Variable reactor pair 90 is connected in the high frequency power supply system of FIG. 1 or FIG. 2 as variable reactor pair 32-33 an/or variable reactor pair 34-35. Stationary split bus section 94 comprises electrically isolated split wedge bus sections 94a and 94b and split electric terminal sections A2 and B2 (associated with wedge bus section 94a) and split electrical terminal sections A1 and B1 (associated with wedge bus section 94b). That is electrically connected bus section 94a and terminal sections A2 and B2 are spatially separated from electrically connected bus section 94b and terminal sections A1 and B1.

FIG. 7 illustrates another example of a high frequency variable reactor 110 that can be used with a high frequency power supply system of the present invention. The high frequency variable reactor 110 comprises a single short-circuited insert core section 112 in the geometric shaped of an elliptic paraboloid that is moved inward or outward into the stationary and complementary geometrically-shaped split elliptic paraboloid bus sections 114a and 114b of stationary spilt-bus section 114 as shown by the double headed arrows in FIG. 7, the magnitude of induced current in the insert core section 112 establishes a variable magnetic flux field (also referred to as the variable energy field) from alternating current flow in the complementary geometrically-shaped split conic bus sections 114a and 114b of stationary split bus section 114 to establish a variable inductance at the split electric bus terminal sections A1-B1 and A2-B2 of the alternating current buses for each of the pair of reactors that can have a range of variable inductance from a minimum inductance valve when the geometrically-shaped insert core section 112 is fully inserted into the complementary geometrically-shaped split conic bus sections 114a and 114b to a maximum inductance value when the geometrically-shaped insert core section 112 is withdrawn to a position where the variable energy field in the shaped interleaving space between the insert core section 112 and stationary spilt-bus section 114 is at a maximum value. Variable reactor pair 110 is connected in the high frequency power supply system of FIG. 1 or FIG. 2 as variable reactor pair 32-33 and/or variable reactor pair 34-35. Stationary split bus section 114 comprises electrically isolated split conic bus sections 114a and 114b and split electric terminal sections A2 and B2 (associated with elliptic paraboloid bus section 114a) and split electrical terminal sections A1 and B1 (associated with elliptic paraboloid bus section 114b). That is electrically connected bus section 114a and terminal sections A2 and B2 are spatially separated from electrically connected bus section 114b and terminal sections A1 and B1.

In other examples of the invention the geometrically shaped high frequency reactor of the present invention can be in other geometric forms, for example, pyramidal, depending upon the variable inductance profile required for a particular application which is a function of the shaped interleaving space between the geometrically-shaped insert core section and the stationary spilt-bus section. For example an application where a particular high frequency variable reactor requires a linear or logarithmic change in inductance to achieve heating with a high frequency electrical heating system of the present invention a particular geometric shape may provide a more closely regulated inductance profile over another geometric shape.

FIG. 8(a) through FIG. 8(d) illustrate one embodiment of a high frequency variable reactor 70 of the present invention that can be used with a high frequency power supply system of the present invention. The high frequency variable reactor 70 comprises a two-turn variable inductor pair 70 where the geometric shape is a conic section and each reactor in a pair, for example, reactors 32 and 33 in FIG. 1 or FIG. 2 has its own conically-shaped insert core section 72a and 72b, respectively, and its own conically-shaped two-turn split bus section 74a and 74b respectively. First stationary split bus section comprises electrically isolated split conic bus section 74a and split electric terminal sections A1 and B1 (connected to two-turn split bus section 74a) and second stationary split bus section comprises electrically isolated two-turn split bus section 74b and split electric terminal sections A2 and B2 (connected to two-turn split bus section 74b). That is electrically connected two-turn split bus section 74a and terminal sections A1 and B1 are spatially separated from electrically connected two-turn split bus section 74b and terminal sections A2 and B2.

Figures 9A, 9B, 9C:
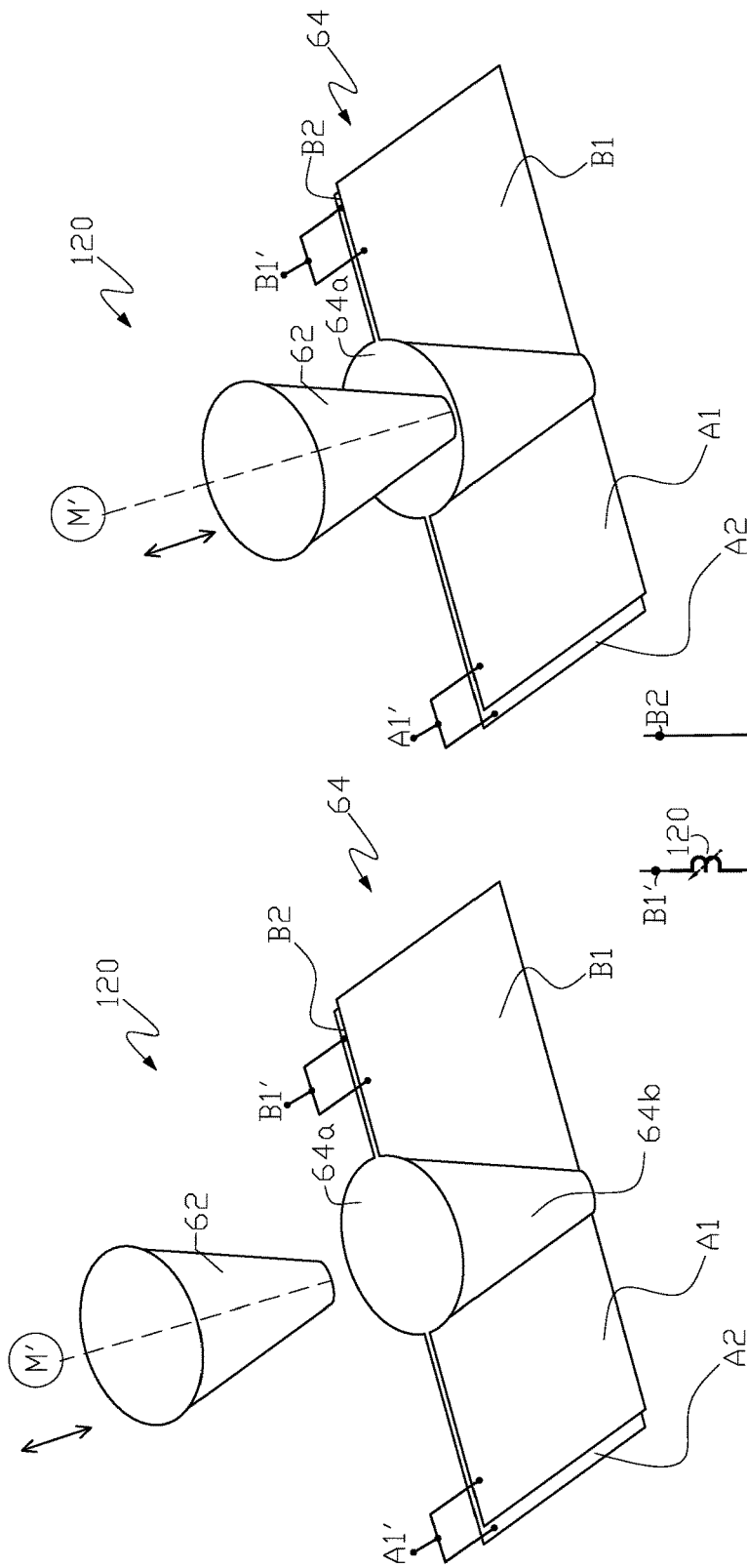
FIG. 9(a) and FIG. 9(b) illustrate one example of a high frequency variable reactor of the present invention comprising geometrically-shaped pair of variable reactors of conic shape with a single solid or hollow conductive core insert of the present invention that can be used in a load matching and frequency control apparatus of the present invention wherein the split-electrical bus section for each of the variable reactors in the reactor pair are joined together to form a single variable reactor.
FIG. 9(c) is a detail of a modified load matching and frequency control apparatus shown in FIG. 1 or FIG. 2 showing where the high frequency reactor in FIG. 9(a) and FIG. 9(b) can be used in a high frequency power supply system.

FIG. 9(a) and FIG. 9(b) illustrate another example of a high frequency variable reactor 120 of the present invention that can be used with a high frequency power supply system of the present invention. The embodiment shown in FIG. 9(a) and FIG. 9(b) is similar to that shown in FIG. 4(a) and FIG. 4(b) except that the split-bus terminal sections A1 and A2 are electrically connected together at bus terminal A1' and B1 and B2 are electrically connected together at bus terminal B1' so that the pair of variable reactors form a single reactor 120. In this embodiment the inductor pair is configured as a single inductor 120 as shown between A1' and B1' in FIG. 9(c) which in some embodiments of the invention replaces the variable series reactor pair 32-33 with single variable reactor 120. Similarly parallel variable reactor pair 34-35 in FIG. 1 or FIG. 2 may also be replaced with a single variable reactor by modifying a geometrically-shaped reactor pair of the present invention as shown in FIG. 9(a) and FIG. 9(b).

In some examples of the high frequency electrical heating system of the present invention an inductor with a fixed value of inductance may be combined in series with any one or more of the variable inductors in an inductor pair of the present invention.

The moveable insert core section for each of the geometrically-shaped pair of high frequency variable reactors of the present invention can be moved in and out of the geometrically-shaped split bus section with a suitable actuator, for example motor M1 or motor M2 as shown in FIG. 3 for reactor pairs 34-35 or 32-33 respectively, where the motor, for example, has a linear, reversible output connection to the insert core section as diagrammatically indicated in the figures with a dashed line connected to the moveable insert core section and an actuator M'.

Full insertion of a moveable insert core to achieve minimum inductance for a particular application can be determined by measuring the application's minimum required inductance when an insert core is positioned within the geometrically-shaped split bus section and withdrawing the insert core to the position at which the application's maximum required inductance is achieved for setting the maximum inductance position of the insert core.

Heating of a geometrically-shaped pair of high frequency variable reactors of the present invention can be dissipated by circulation of a cooling medium, for example, in a cooling tube in thermal contact with the stationary split-bus section and/or the moveable insert core section.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A high frequency electrical heating system for a heating of a portion or a portions of a metal part or parts as the portion or the portions of the metal part or parts are advanced, the high frequency electrical heating system comprising:
    a solid state electrical inverter having an inverter output leads for providing a high frequency electrical power, a magnitude and a frequency of the high frequency electrical power dependent upon an impedance of a load connected to the solid state electrical inverter, the load comprising a means for causing an electrical heating current to flow in the portion or the portions of the metal part or parts while advancing the metal part or parts; and
    a load matching and frequency control apparatus connected to the inverter output leads and to the means for causing the electrical heating current to flow in the portion or the portions, the load matching and frequency control apparatus comprising:
    a first pair of variable reactors electrically connected in series in the inverter output leads and the load and a second pair of variable reactors electrically connected in parallel with the inverter output leads, each of the first pair of variable reactors and each of the second pair of variable reactors producing a variable energy fields when electrically energized, the variable energy fields and the first and the second pairs of variable reactors, being variable in reactance, by a variable energy field varying means adjacent thereto and movable with respect thereto; and
    at least one capacitor electrically connected to the inverter output leads and the load.

2. The high frequency electrical heating system of claim 1 wherein the solid state electrical inverter is alternatively a voltage source series tuned inverter and the at least one capacitor is in electrical series in one of the inverter output leads with one of the first pair of variable reactors or a current source parallel inverter and the at least one capacitor is connected in electrical parallel with the inverter output leads.

3. The high frequency electrical heating system of claim 2 wherein the voltage source series tuned inverter has a second capacitor connected electrically in parallel with the inverter output leads with a first terminal of the second capacitor being electrically connected intermediate the at least one capacitor and the one of the first pair of variable reactors.

4. The high frequency electrical heating system of claim 1 wherein the first pair of variable reactors and the second pair of variable reactors each comprise a geometrically-shaped pair of reactors comprising:
    a geometrically-shaped moveable insert core;
    a stationary split-bus comprising:
        a geometrically-shaped split bus section having a geometric complementary shape to the geometrically-shaped moveable insert core to provide an adjustable positions of insertion of the geometrically-shaped moveable insert core into the geometrically-shaped split bus section to vary an inductance of the geometrically-shaped pair of reactors from a minimum inductance value when the geometrically-shaped moveable insert core is fully inserted into the geometrically-shaped split bus section to a maximum inductance value when withdrawn from the geometrically-shaped split bus section to a position where the variable energy fields in a shaped interleaving space between the geometrically-shaped moveable insert core and the geometrically-shaped split bus section are at a maximum value; and a split electric bus terminal section for an electrical connection of the geometrically-shaped pair of reactors in the load matching and frequency control apparatus; and an actuator connected to the geometrically-shaped moveable insert core for inserting and withdrawing the geometrically-shaped moveable insert core into and from the geometrically-shaped split bus section.

5. The high frequency electrical heating system of claim 4 wherein the geometrically-shaped moveable insert core is formed from a short-circuited electrically conductive material.

6. The high frequency electrical heating system of claim 5 wherein the short-circuited electrically conductive material alternatively comprises a copper sheet or a solid copper insert core.

7. The high frequency electrical heating system of claim 4 wherein the geometrically-shaped moveable insert core is alternatively formed from a solid or a hollow magnetic material.

8. The high frequency electrical heating system of claim 7 wherein the solid or the hollow magnetic material comprises a ferrite or a plurality of ferrites.

9. The high frequency electrical heating system of claim 4 wherein the geometrically-shaped moveable insert core and the geometrically-shaped split bus section are selected from the group of conic sections, wedge sections and parabolic conic sections.

10. The high frequency electrical heating system of claim 4 further comprising at least one fixed inductor in series combination with at least one reactor comprising either the first pair of variable reactors or the second pair of variable reactors.

11. The high frequency electrical heating system of claim 4 wherein the split electric bus terminal section of the first pair of variable reactors are connected together to electrically form a single series variable reactor connected in one of the inverter output leads and the second pair of variable reactors are connected together to electrically form a single parallel variable reactor connected in parallel with the inverter output leads.

12. A high frequency variable reactor comprising a geometrically-shaped pair of reactors comprising:
    a geometrically-shaped moveable insert core;
    a stationary split-bus comprising:
        a geometrically-shaped split bus section having a geometric complementary shape to the geometrically-shaped moveable insert core to provide an adjustable positions of insertion of the geometrically-shaped moveable insert core into the geometrically-shaped split bus section to vary an inductance of the geometrically-shaped pair of reactors from a minimum inductance value when the geometrically-shaped moveable insert core is fully inserted into the geometrically-shaped split bus section to a maximum inductance value when withdrawn from the geometrically-shaped split bus section to a position where a variable energy field in a shaped interleaving space between the geometrically-shaped moveable insert core and the geometrically-shaped split bus section is at a maximum value when the geometrically-shaped pair of reactors are electrically energized; and
        a split electric bus terminal section for an electrical connection of each one of the geometrically-shaped pair of reactors to a source of an electric power; and
    an actuator connected to the geometrically-shaped moveable insert core for inserting and withdrawing the geometrically-shaped moveable insert core into and from the geometrically-shaped split bus section.

13. The high frequency variable reactor of claim 12 wherein the geometrically-shaped moveable insert core is formed from a short-circuited electrically conductive material.

14. The high frequency variable reactor of claim 13 wherein the short-circuited electrically conductive material alternatively comprises a copper sheet or a solid copper insert core.

15. The high frequency variable reactor of claim 12 wherein the geometrically-shaped moveable insert core is alternatively formed from a solid or a hollow magnetic material.

16. The high frequency variable reactor of claim 15 wherein the solid or the hollow magnetic material comprises a ferrite or a plurality of ferrites.

17. The high frequency variable reactor of claim 12 wherein the geometrically-shaped moveable insert core and the geometrically-shaped split bus section are selected from the group of conic sections, wedge sections and parabolic conic sections.

18. The high frequency variable reactor of claim 12 further comprising at least one fixed inductor in series combination with at least one reactor comprising the geometrically-shaped pair of reactors.

19. The high frequency variable reactor of claim 12 wherein the geometrically-shaped split bus section comprises a double two-turn conic section and the geometrically-shaped moveable insert core comprises a first and a second conic-shaped insert cores.

20. The high frequency variable reactor of claim 12 wherein the split electric bus terminal section for the electrical connection of each one of the geometrically-shaped pair of reactors are connected together to form a single geometrically-shaped variable reactor.

* * * * *